US011584390B2

(12) United States Patent
Ferzli et al.

(10) Patent No.: US 11,584,390 B2
(45) Date of Patent: Feb. 21, 2023

(54) SYSTEM AND METHOD FOR SIMULATION OF AUTONOMOUS VEHICLES

(71) Applicant: Intel Corporation, Santa Clara, CA (US)

(72) Inventors: Rony Ferzli, Chandler, AZ (US); John Charles Weast, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 16/648,459

(22) PCT Filed: Dec. 28, 2017

(86) PCT No.: PCT/US2017/068772
§ 371 (c)(1),
(2) Date: Mar. 18, 2020

(87) PCT Pub. No.: WO2019/132930
PCT Pub. Date: Jul. 4, 2019

(65) Prior Publication Data
US 2020/0231177 A1 Jul. 23, 2020

(51) Int. Cl.
*G06F 7/00* (2006.01)
*B60W 60/00* (2020.01)
(Continued)

(52) U.S. Cl.
CPC ..... *B60W 60/0011* (2020.02); *G06F 16/9035* (2019.01); *G06F 16/9038* (2019.01);
(Continued)

(58) Field of Classification Search
CPC ............ B60W 60/0011; G06F 16/9038; G06F 16/957; G06F 16/9035; G06K 9/6256; G06N 3/02; G06N 5/025
(Continued)

(56) References Cited

U.S. PATENT DOCUMENTS 9,754,325 B1 9/2017 Konrardy et al.
10,599,546 B1 * 3/2020 Walther .............. G06F 11/3457
(Continued)

FOREIGN PATENT DOCUMENTS

WO WO-2016172009 A1 10/2016
WO WO-2019132930 A1 7/2019

OTHER PUBLICATIONS

"International Application Serial No. PCT US2017 068772, International Preliminary Report on Patentability dated Jul. 9, 2020", 15 pgs.
(Continued)

*Primary Examiner* — Isaac M Woo
(74) *Attorney, Agent, or Firm* — Schwegman Lundberg & Woessner, P.A.

(57) ABSTRACT

Various systems and methods for creating and managing a simulation database system are described herein. A system for creating and managing a simulation database system includes a processor subsystem; and memory including instructions, which when executed by the processor subsystem, cause the processor subsystem to: access an operating scenario, the operating scenario including parameters defining an environment for a simulated autonomous vehicle; access a rule set, the rule set controlling a search mechanism; search for content, the search controlled by the rule set and operable to find content relevant to the operating scenario, the search resulting in search results; process the search results for training autonomous vehicle operation; and store the processed search results.

25 Claims, 3 Drawing Sheets

(51) Int. Cl.
    *G06F 16/9038*    (2019.01)
    *G06F 16/957*     (2019.01)
    *G06F 16/9035*    (2019.01)
    *G06K 9/62*       (2022.01)
    *G06N 3/02*       (2006.01)
    *G06N 5/025*      (2023.01)

(52) U.S. Cl.
    CPC ......... *G06F 16/957* (2019.01); *G06K 9/6256* (2013.01); *G06N 3/02* (2013.01); *G06N 5/025* (2013.01)

(58) Field of Classification Search
    USPC .................................... 707/600–899; 701/23
    See application file for complete search history.

(56) References Cited

U.S. PATENT DOCUMENTS

| | | |
|---|---|---|
| 2014/0195093 A1 | 7/2014 | Litkouhi et al. |
| 2016/0210383 A1 | 7/2016 | Alaniz et al. |
| 2017/0309072 A1 | 10/2017 | Li et al. |

OTHER PUBLICATIONS

"International Application Serial No. PCT/US2017/068772, International Search Report dated Sep. 10, 2018", 3 pgs.
"International Application Serial No. PCT/US2017/068772, Written Opinion dated Sep. 10, 2018", 10 pgs.

\* cited by examiner

SYSTEM AND METHOD FOR SIMULATION OF AUTONOMOUS VEHICLES

This application is a U.S. National Stage Filing under 35 U.S.C. 371 from International Application No. PCT/US2017/068772, filed Dec. 28, 2017 and published in English as WO 2019/132930 on Jul. 4, 2019, which is incorporated herein by reference in its entirety.

TECHNICAL FIELD

Embodiments described herein generally relate to vehicle testing and in particular, to a mechanism to simulate real world events for training autonomous vehicles.

BACKGROUND

Autonomous vehicles, also referred to as self-driving cars, driverless cars, uncrewed vehicles, or robotic vehicles, are vehicles capable of replacing traditional vehicles for conventional transportation. Elements of autonomous vehicles have been introduced slowly over the years, such as through the use of advanced driver assistance systems (ADAS). ADAS are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Systems and methods described herein provide mechanisms to simulate real world events to train, evaluate, and test automated driving algorithms that operate autonomous vehicles. Conventional methods to train an autonomous vehicle involve collecting enormous datasets. These datasets may be obtained by proprietary fleets of sensor-equipped vehicles that drive on various roadways in various conditions to capture video and other data. This is costly and inefficient. What is needed is a mechanism to address the data collection and management issues that exist with the current systems.

This disclosure provides advantages that reduce time for data collection, development, testing, and validation, thus reducing costs associated with training autonomous systems. The mechanisms discussed also reduce the time to market for new vehicle driving algorithms. Instead of relying on direct measurement obtained by a single fleet of vehicles, the improvement involves using the millions upon millions of publicly available online resources as a database of use cases to train ADAS. In addition, the mechanisms discussed provide a way to design a simulation or driving scenario to better tailor learning routines. The mechanisms may further be used for other processes, including algorithm development, machine learning, platform benchmarking, and the like. Various other aspects are discussed throughout this document. Aspects may be combined and modified to incorporate one aspect with one or more other aspects.

Figure 1:
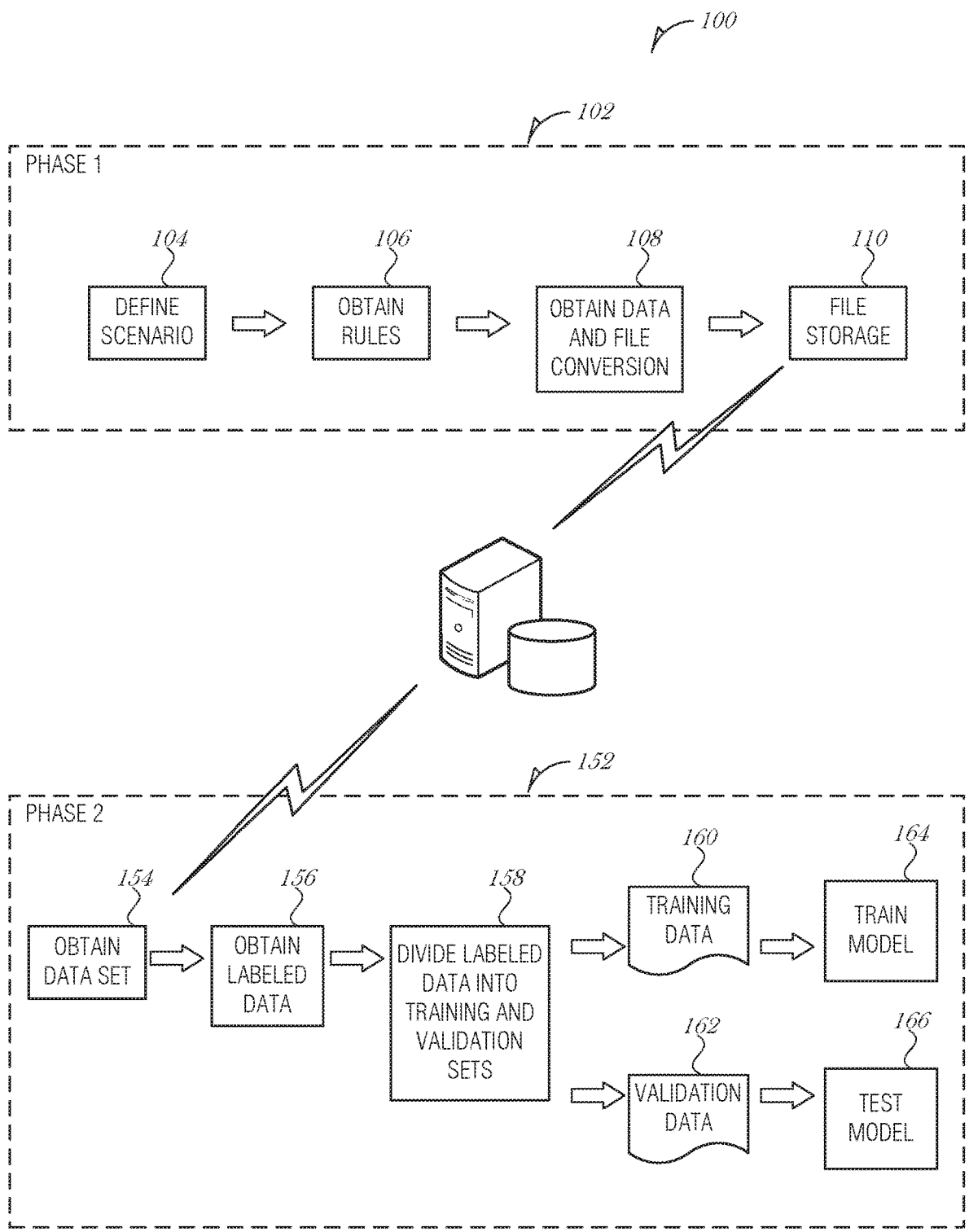
FIG. 1 is a schematic drawing illustrating a two-stage process of collecting and using an expansive dataset, according to an embodiment.

FIG. 1 is a schematic drawing illustrating a two-stage process 100 of collecting and using an expansive dataset, according to an embodiment. In a first phase 102, a World Model Database (WMD) is created for a particular scenario. To create the WMD, the scenario is identified (operation 104). The scenario may be defined by use of one or more parameters, such as a type of highway segment, a type of roadway intersection, a time of day, a place of operation, weather, road condition, etc.

At operation 106, an associated set of rules is obtained. The rules are used to control a data spider (e.g., crawler) in the identification of potentially relevant data. The data may be textual metadata, images, video, or the like. The rules may be also define possible data sources on the internet or other location. For example, the rules may identify online streaming sources (e.g., NETFLIX®, HULU®, etc.), computer game titles, discussion boards, video sharing platforms (e.g., YOUTUBE®, VIMEO®, etc.), mapping services (e.g., GOOGLE® MAPS, BING® MAPS, etc.), image sharing platforms (e.g., PHOTOBUCKET®, INSTAGRAM®, etc.), social media platforms (e.g., FACEBOOK®, TWITTER®, LINKEDIN®, etc.), news platforms (e.g., CNN®, FOXNEWS®, etc.), or other data sources for the data spider to search.

At operation 108, data is retrieved from the identified sources and converted to a neutral file format. For example, videos stored at one content provider may be provided in a proprietary format and videos stored at another content provider may be stored in a commonly accessible format (e.g., MPEG-2). Converting to a neutral file format, which may also be considered a form of normalization, may convert the videos from the proprietary format to MPEG-2. In this way, the videos may be combined or otherwise processed. For example, a set of images from Google® street view may be stitched together into a video for use as training data for a neural network. As another example, YouTube® video may be analyzed and the objects in the video may be translated into a virtual representation so that video from different users on YouTube® may be combined with the same data neutral format. At operation 110, the data is compressed (optional) and stored in the WMD. The data may be stored in the cloud or locally (e.g., at an onsite data center). The data may be indexed, partitioned, compressed, or otherwise processed for efficient database storage and algorithm development.

Optionally, instead of retrieving files from sources and converting (operation 108) and storing them (operation 11) locally, the process 100 may identify files, or portions of files, and store references to the files (or portions thereof). By storing references, such as a start time in the video file and a length of the video clip to use, the amount of local storage required is greatly reduced. In addition, by storing references to the video instead of copies of the video, copyright, licensing, and other legal issues may be avoided or mitigated.

In a second phase 152, the data obtained in the first stage 102 is used to develop and validate an algorithm under test for a specific scenario and test case. At operation 154, the data set for a scenario is retrieved from the WMD. The data set may be retrieved from the cloud, from local storage, or from a combination of locations.

At operation 156, given a certain test case per scenario, the labeled data for the test case is retrieved. If this is the first time that the data has been retrieved for a specific label, the labels may be created and stored for future use. The labels may be created manually or automatically.

At operation 158, the labeled data set is divided into two subsets of data: a training set 160 and a validation set 162. The training set 160 is used to train a predictive model (operation 164). Each input vector in the training set may be associated with a desired output. The validation set 162 is used to test the algorithm (operation 166). The algorithm under test will use the input vector of the validation set and compute an output. The computed output will be compared to a ground truth representing the desired output to assess the accuracy of the algorithm. For instance, the training and validation is performed to support a supervised learning approach, a machine learning approach, a classical approach, or other classification, machine learning, statistical modeling, or related approaches.

Figure 2:
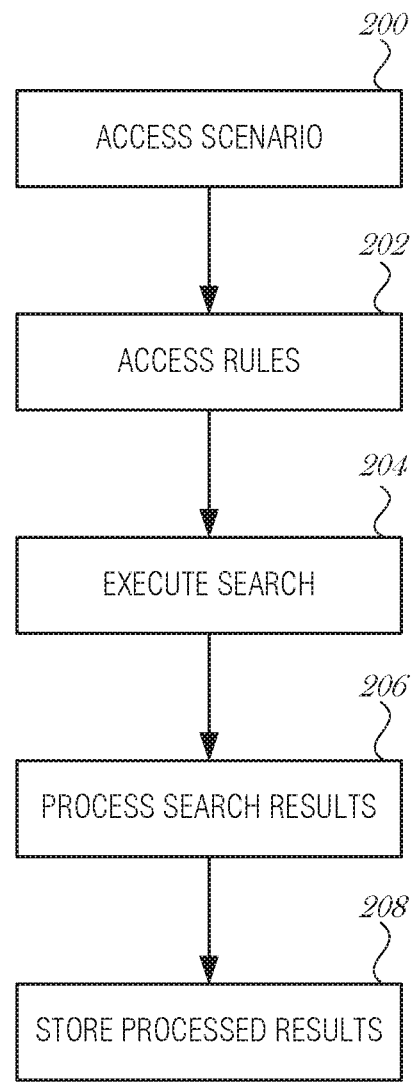
FIG. 2 is a flowchart illustrating a method for building a scenario to train autonomous vehicles, according to an embodiment.

FIG. 2 is a flowchart illustrating an operation 108 for building a scenario to train autonomous vehicles, according to an embodiment. Parameters defining a scenario are accessed (operation 200). The parameters may include one or more of the following: a scenario type, a road type, a weather condition, or a time. Some parameters may influence or set other parameters.

The scenario type may describe various situations in which a vehicle may operate, such as a highway driving scenario, a city driving scenario, a rural driving scenario, or the like. Scenarios may include various parameters included in the scenario, such as the road type.

The road type may describe various road sections, lane configurations, intersections, or the like. Example road types include, but are not limited to, a two-lane expressway (e.g., one lane in each direction without a median barrier), a four-lane divided highway (e.g., two lanes in each direction separated by a median barrier), an on-ramp, an off-ramp, a one-way road, an unmarked city street, or the like. Lane configurations may refer to the number of lanes in one or both directions of a road. Intersections may refer to the number of stop signs, signal lights, or other control apparatus at an intersection; or the number or type of roads that intersect (e.g., highway off-ramp, at-grade T-intersection, roundabout, etc.).

The weather condition may refer to the road condition (e.g., wet, dry, snow packed, etc.) or the environmental weather conditions (e.g., foggy, raining, overcast but not raining, sunny, sunset, etc.).

The time may refer to a season, a time of a week, or a time of day. The time may influence the weather parameter (e.g., winter may result in snowy roads, or 3:00 AM may result in a night setting). The time may be used to influence other parameters as well, such as the number of pedestrians present on the sidewalks in an inner city scenario.

Depending on the complexity of the design, the parameters may control specific aspects of a scenario, such as the number or type of road signs, the number or type of traffic signals, the number or type of pedestrians, the number or type of additional vehicles on the road, and the like. It is understood that more or fewer parameters may be implemented than those listed in this document.

At operation 202, the rules that control the search mechanism are accessed. The rules may have been provided by a user, such as via a user interface. The rules may be associated with a scenario or scenario type, for example. Optionally, the rules may be set by a system administrator.

In general, the rules are used to define how and what to search to obtain images, video, or other data regarding the scenario defined in operation 200. The rules may include one or more data sources to search. The data sources may be content websites, such as YOUTUBE®, search engines, such as GOOGLE®, or other network-accessible repositories or data sources (e.g., discussion boards).

In addition, the rules may indicate how to search. Rules may be used to define whether something is relevant to a search. For instance, rules may be used to associate terms with concepts. Semantic analysis may be used to map natural language expressions found in search results with parameters that were used to define the scenario. For example, if searching for video footage of a winter road scenario, semantic analysis may be used to analyze dialog from a movie scene and determine that the actors are discussing Christmas while in the car. This clue, along with possibly others obtained from additional analysis, may be used to infer that the actors are operating their vehicle during winter. The scene may be used as input for training or validating an autonomous vehicle algorithm.

At operation 204, the search is performed to identify content that is relevant to the defined scenario. The search is performed on the data sources and using search rules from operation 202. The search may implement a web crawler (e.g., search spider) to browse through a network-accessible repository (e.g., a website), for example, and index or scrape the network-accessible repository. Images or video may be retrieved from the data sources.

At operation 206, the search results are processed. Processing may take various forms including, but not limited to, image stitching, video clipping, video translation and conversion, compression, encryption, and the like.

In an example, multiple images are stitched together to form a video clip. For instance, multiple images of a street may be concatenated or stitched together to form a video clip that represents motion from a vehicle's point of view.

In another example, video clipping may be used to extract a segment of video from a longer video. For instance, a theater length movie may include a driving scene that is thirty seconds long. Instead of storing and maintaining the entire ninety minute movie, operation 206 may extract the portion or portions of video with driving or street scenes.

Video translation may be used to merge videos from several different data sources. Videos may be converted to a common neutral format and then translated into a virtual representation, allowing the videos to be used together.

Compression may be used to reduce the file size of videos and encryption may be used to secure the contents of videos in any state (e.g., raw, extracted, clipped, translated, compressed, converted, etc.).

Videos may be further processed by tagging or labeling the contents of a video. Videos may be tagged so that in future uses they may be easier to locate. The tagging may be stored in metadata tags that are incorporated into a video file (e.g., in a header portion of the video file).

Video content may also be labeled. Labeling is used on training data for a machine learning algorithm. The training data includes a set of training examples, where each training example includes an input object and a desired output. The input object is used to increase the accuracy of an algorithm, which may be then be tested using a validation data set. The labeling may be automatic or manually performed.

The processed data is stored (operation 208) for use in training and validating algorithms used in autonomous vehicle operation.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 3:
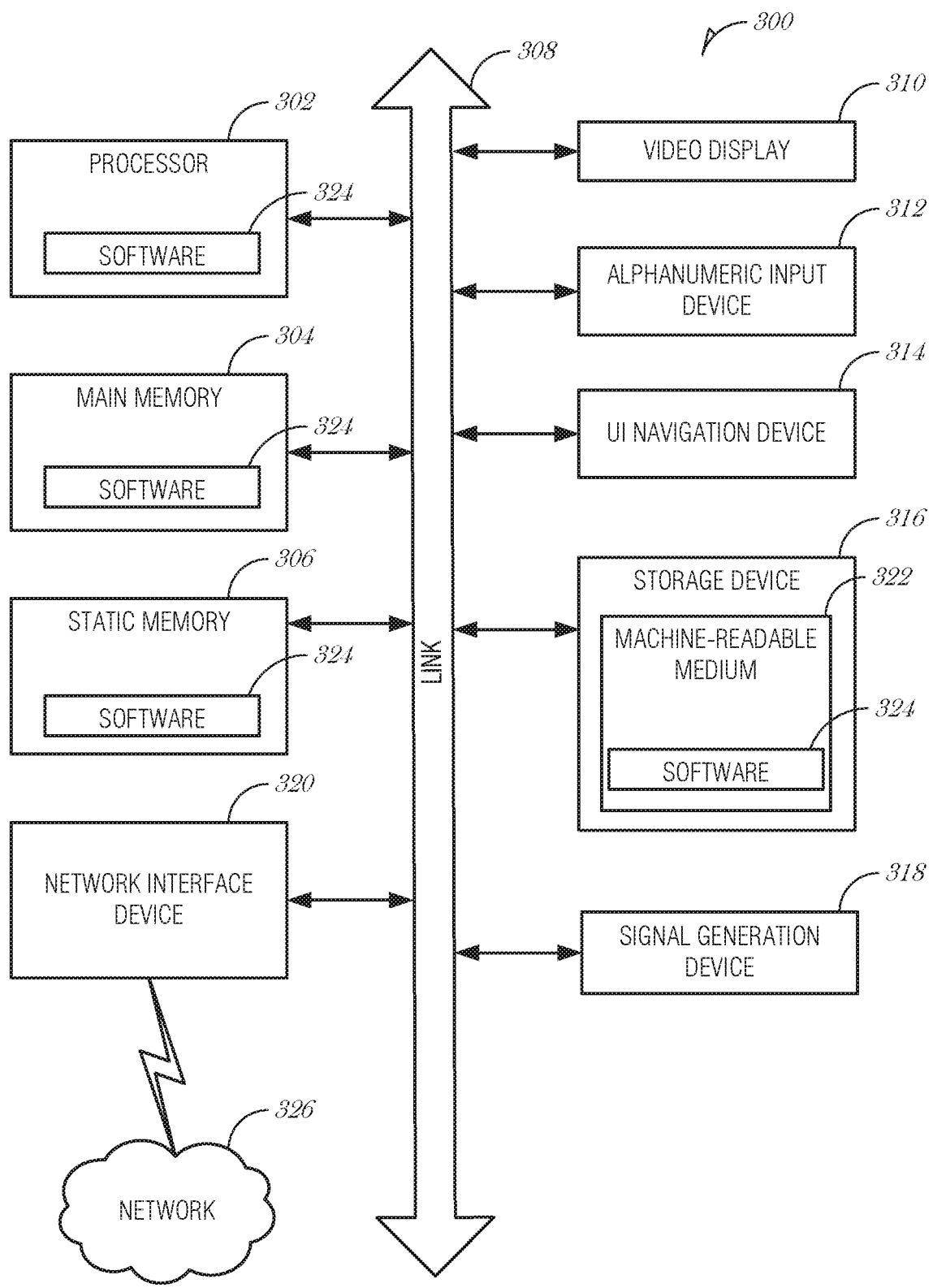
FIG. 3 is a block diagram illustrating an example machine upon which any one or more of the techniques (e.g., methodologies) discussed herein may perform, according to an example embodiment.

FIG. 3 is a block diagram illustrating a machine in the example form of a computer system 300, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computer system 300 may further include a video display unit 310, an alphanumeric input device 312 (e.g., a keyboard), and a user interface (UI) navigation device 314 (e.g., a mouse). In one embodiment, the video display unit 310, input device 312 and UI navigation device 314 are incorporated into a touch screen display. The computer system 300 may additionally include a storage device 316 (e.g., a drive unit), a signal generation device 318 (e.g., a speaker), a network interface device 320, and one or more sensors (not shown), such as a global positioning system (GPS) sensor, compass, accelerometer, or other sensor.

The storage device 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computer system 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for creating and managing a simulation database system, the system comprising: a processor subsystem; and memory including instructions, which when executed by the processor subsystem, cause the processor subsystem to: access an operating scenario, the operating scenario including parameters defining an environment for a simulated autonomous vehicle; access a rule set, the rule set controlling a search mechanism; search for content, the search controlled by the rule set and operable to find content relevant to the operating scenario, the search resulting in search results; process the search results for training autonomous vehicle operation; and store the processed search results.

In Example 2, the subject matter of Example 1 includes, wherein the operating scenario parameters include parameters that define a scenario type.

In Example 3, the subject matter of Example 2 includes, wherein the scenario type includes a highway driving scenario, a city driving scenario, or a rural driving scenario.

In Example 4, the subject matter of Examples 1-3 includes, wherein the operating scenario includes parameters that define a road type.

In Example 5, the subject matter of Example 4 includes, wherein the road type includes a two-lane expressway.

In Example 6, the subject matter of Examples 1-5 includes, wherein the operating scenario includes parameters that define a weather condition.

In Example 7, the subject matter of Example 6 includes, wherein the weather condition includes a road condition.

In Example 8, the subject matter of Example 7 includes, wherein the road condition is wet, dry, or snow covered.

In Example 9, the subject matter of Examples 1-8 includes, wherein the operating scenario includes parameters that define an operating time.

In Example 10, the subject matter of Examples 1-9 includes, wherein the operating time is a season of a year.

In Example 11, the subject matter of Examples 1-10 includes, wherein the rule set includes a data source parameter.

In Example 12, the subject matter of Examples 1-11 includes, wherein the rule set includes semantic analysis parameters.

In Example 13, the subject matter of Examples 1-12 includes, wherein to search for content, the processor subsystem is to crawl a network-accessible repository to identify media content relevant to the operating scenario using contextual analysis.

In Example 14, the subject matter of Example 13 includes, wherein the network-accessible repository is a website.

In Example 15, the subject matter of Examples 13-14 includes, wherein the network-accessible repository is a discussion board.

In Example 16, the subject matter of Examples 13-15 includes, wherein the network-accessible repository is a database.

In Example 17, the subject matter of Examples 13-16 includes, wherein the network-accessible repository is an online service.

In Example 18, the subject matter of Examples 13-17 includes, wherein the media content is video content.

In Example 19, the subject matter of Examples 13-18 includes, wherein the media content is image content.

In Example 20, the subject matter of Examples 13-19 includes, wherein the media content is audiovisual content.

In Example 21, the subject matter of Examples 13-20 includes, wherein the operating scenario is to train a pedestrian detection algorithm, and wherein the content relevant to the operating scenario includes forward-facing views from a perspective of the simulated autonomous vehicle.

In Example 22, the subject matter of Examples 13-21 includes, wherein the operating scenario is to train a house number detection algorithm, and wherein the content relevant to the operating scenario includes side-facing views from a perspective of the simulated autonomous vehicle.

In Example 23, the subject matter of Examples 13-22 includes, wherein the operating scenario is to train a traffic management algorithm, and wherein the content relevant to the operating scenario includes a third-person view of the simulated autonomous vehicle.

In Example 24, the subject matter of Examples 1-23 includes, wherein to process the search results for training autonomous vehicle operation, the processor subsystem is to: convert the search results to a neutral format; and combine the search results with other content to result in a data set to use in training autonomous vehicle operation.

In Example 25, the subject matter of Examples 1-24 includes, wherein to process the search results for training autonomous vehicle operation, the processor subsystem is to label the search results for use in a supervised machine learning task.

Example 26 is a method of creating and managing a simulation database system, the method comprising: accessing an operating scenario, the operating scenario including parameters defining an environment for a simulated autonomous vehicle; accessing a rule set, the rule set controlling a search mechanism; searching for content, the search controlled by the rule set and operable to find content relevant to the operating scenario, the search resulting in search results; processing the search results for training autonomous vehicle operation; and storing the processed search results.

In Example 27, the subject matter of Example 26 includes, wherein the operating scenario parameters include parameters that define a scenario type.

In Example 28, the subject matter of Example 27 includes, wherein the scenario type includes a highway driving scenario, a city driving scenario, or a rural driving scenario.

In Example 29, the subject matter of Examples 26-28 includes, wherein the operating scenario includes parameters that define a road type.

In Example 30, the subject matter of Example 29 includes, wherein the road type includes a two-lane expressway.

In Example 31, the subject matter of Examples 26-30 includes, wherein the operating scenario includes parameters that define a weather condition.

In Example 32, the subject matter of Example 31 includes, wherein the weather condition includes a road condition.

In Example 33, the subject matter of Example 32 includes, wherein the road condition is wet, dry, or snow covered.

In Example 34, the subject matter of Examples 26-33 includes, wherein the operating scenario includes parameters that define an operating time.

In Example 35, the subject matter of Examples 26-34 includes, wherein the operating time is a season of a year.

In Example 36, the subject matter of Examples 26-35 includes, wherein the rule set includes a data source parameter.

In Example 37, the subject matter of Examples 26-36 includes, wherein the rule set includes semantic analysis parameters.

In Example 38, the subject matter of Examples 26-37 includes, wherein searching for content comprises crawling a network-accessible repository to identify media content relevant to the operating scenario using contextual analysis.

In Example 39, the subject matter of Example 38 includes, wherein the network-accessible repository is a website.

In Example 40, the subject matter of Examples 38-39 includes, wherein the network-accessible repository is a discussion board.

In Example 41, the subject matter of Examples 38-40 includes, wherein the network-accessible repository is a database.

In Example 42, the subject matter of Examples 38-41 includes, wherein the network-accessible repository is an online service.

In Example 43, the subject matter of Examples 38-42 includes, wherein the media content is video content.

In Example 44, the subject matter of Examples 38-43 includes, wherein the media content is image content.

In Example 45, the subject matter of Examples 38-44 includes, wherein the media content is audiovisual content.

In Example 46, the subject matter of Examples 38-45 includes, wherein the operating scenario is to train a pedestrian detection algorithm, and wherein the content relevant to the operating scenario includes forward-facing views from a perspective of the simulated autonomous vehicle.

In Example 47, the subject matter of Examples 38-46 includes, wherein the operating scenario is to train a house number detection algorithm, and wherein the content relevant to the operating scenario includes side-facing views from a perspective of the simulated autonomous vehicle.

In Example 48, the subject matter of Examples 38-47 includes, wherein the operating scenario is to train a traffic management algorithm, and wherein the content relevant to the operating scenario includes a third-person view of the simulated autonomous vehicle.

In Example 49, the subject matter of Examples 26-48 includes, wherein processing the search results for training autonomous vehicle operation comprises: converting the search results to a neutral format; and combining the search results with other content to result in a data set to use in training autonomous vehicle operation.

In Example 50, the subject matter of Examples 26-49 includes, wherein processing the search results for training autonomous vehicle operation comprises labeling the search results for use in a supervised machine learning task.

Example 51 is at least one machine-readable medium including instructions, which when executed by a machine, cause the machine to perform operations of any of the methods of Examples 26-50.

Example 52 is an apparatus comprising means for performing any of the methods of Examples 26-50.

Example 53 is an apparatus for creating and managing a simulation database system, the apparatus comprising: means for accessing an operating scenario, the operating scenario including parameters defining an environment for a simulated autonomous vehicle; means for accessing a rule set, the rule set controlling a search mechanism; means for searching for content, the search controlled by the rule set and operable to find content relevant to the operating scenario, the search resulting in search results; means for processing the search results for training autonomous vehicle operation; and means for storing the processed search results.

In Example 54, the subject matter of Example 53 includes, wherein the operating scenario parameters include parameters that define a scenario type.

In Example 55, the subject matter of Example 54 includes, wherein the scenario type includes a highway driving scenario, a city driving scenario, or a rural driving scenario.

In Example 56, the subject matter of Examples 53-55 includes, wherein the operating scenario includes parameters that define a road type.

In Example 57, the subject matter of Example 56 includes, wherein the road type includes a two-lane expressway.

In Example 58, the subject matter of Examples 53-57 includes, wherein the operating scenario includes parameters that define a weather condition.

In Example 59, the subject matter of Example 58 includes, wherein the weather condition includes a road condition.

In Example 60, the subject matter of Example 59 includes, wherein the road condition is wet, dry, or snow covered.

In Example 61, the subject matter of Examples 53-60 includes, wherein the operating scenario includes parameters that define an operating time.

In Example 62, the subject matter of Examples 53-61 includes, wherein the operating time is a season of a year.

In Example 63, the subject matter of Examples 53-62 includes, wherein the rule set includes a data source parameter.

In Example 64, the subject matter of Examples 53-63 includes, wherein the rule set includes semantic analysis parameters.

In Example 65, the subject matter of Examples 53-64 includes, wherein the means for searching for content comprise means for crawling a network-accessible repository to identify media content relevant to the operating scenario using contextual analysis.

In Example 66, the subject matter of Example 65 includes, wherein the network-accessible repository is a website.

In Example 67, the subject matter of Examples 65-66 includes, wherein the network-accessible repository is a discussion board.

In Example 68, the subject matter of Examples 65-67 includes, wherein the network-accessible repository is a database.

In Example 69, the subject matter of Examples 65-68 includes, wherein the network-accessible repository is an online service.

In Example 70, the subject matter of Examples 65-69 includes, wherein the media content is video content.

In Example 71, the subject matter of Examples 65-70 includes, wherein the media content is image content.

In Example 72, the subject matter of Examples 65-71 includes, wherein the media content is audiovisual content.

In Example 73, the subject matter of Examples 65-72 includes, wherein the operating scenario is to train a pedestrian detection algorithm, and wherein the content relevant to the operating scenario includes forward-facing views from a perspective of the simulated autonomous vehicle.

In Example 74, the subject matter of Examples 65-73 includes, wherein the operating scenario is to train a house number detection algorithm, and wherein the content relevant to the operating scenario includes side-facing views from a perspective of the simulated autonomous vehicle.

In Example 75, the subject matter of Examples 65-74 includes, wherein the operating scenario is to train a traffic management algorithm, and wherein the content relevant to the operating scenario includes a third-person view of the simulated autonomous vehicle.

In Example 76, the subject matter of Examples 53-75 includes, wherein the means for processing the search results for training autonomous vehicle operation comprise: means for converting the search results to a neutral format; and means for combining the search results with other content to result in a data set to use in training autonomous vehicle operation.

In Example 77, the subject matter of Examples 53-76 includes, wherein the means for processing the search results for training autonomous vehicle operation comprise means for labeling the search results for use in a supervised machine learning task.

Example 78 is at least one machine-readable medium including instructions for creating and managing a simulation database system, which when executed by a machine, cause the machine to perform the operations comprising: accessing an operating scenario, the operating scenario including parameters defining an environment for a simulated autonomous vehicle; accessing a rule set, the rule set controlling a search mechanism; searching for content, the search controlled by the rule set and operable to find content relevant to the operating scenario, the search resulting in search results; processing the search results for training autonomous vehicle operation; and storing the processed search results.

In Example 79, the subject matter of Example 78 includes, wherein the operating scenario parameters include parameters that define a scenario type.

In Example 80, the subject matter of Example 79 includes, wherein the scenario type includes a highway driving scenario, a city driving scenario, or a rural driving scenario.

In Example 81, the subject matter of Examples 78-80 includes, wherein the operating scenario includes parameters that define a road type.

In Example 82, the subject matter of Example 81 includes, wherein the road type includes a two-lane expressway.

In Example 83, the subject matter of Examples 78-82 includes, wherein the operating scenario includes parameters that define a weather condition.

In Example 84, the subject matter of Example 83 includes, wherein the weather condition includes a road condition.

In Example 85, the subject matter of Example 84 includes, wherein the road condition is wet, dry, or snow covered.

In Example 86, the subject matter of Examples 78-85 includes, wherein the operating scenario includes parameters that define an operating time.

In Example 87, the subject matter of Examples 78-86 includes, wherein the operating time is a season of a year.

In Example 88, the subject matter of Examples 78-87 includes, wherein the rule set includes a data source parameter.

In Example 89, the subject matter of Examples 78-88 includes, wherein the rule set includes semantic analysis parameters.

In Example 90, the subject matter of Examples 78-89 includes, wherein searching for content comprises crawling a network-accessible repository to identify media content relevant to the operating scenario using contextual analysis.

In Example 91, the subject matter of Example 90 includes, wherein the network-accessible repository is a website.

In Example 92, the subject matter of Examples 90-91 includes, wherein the network-accessible repository is a discussion board.

In Example 93, the subject matter of Examples 90-92 includes, wherein the network-accessible repository is a database.

In Example 94, the subject matter of Examples 90-93 includes, wherein the network-accessible repository is an online service.

In Example 95, the subject matter of Examples 90-94 includes, wherein the media content is video content.

In Example 96, the subject matter of Examples 90-95 includes, wherein the media content is image content.

In Example 97, the subject matter of Examples 90-96 includes, wherein the media content is audiovisual content.

In Example 98, the subject matter of Examples 90-97 includes, wherein the operating scenario is to train a pedestrian detection algorithm, and wherein the content relevant to the operating scenario includes forward-facing views from a perspective of the simulated autonomous vehicle.

In Example 99, the subject matter of Examples 90-98 includes, wherein the operating scenario is to train a house number detection algorithm, and wherein the content relevant to the operating scenario includes side-facing views from a perspective of the simulated autonomous vehicle.

In Example 100, the subject matter of Examples 90-99 includes, wherein the operating scenario is to train a traffic management algorithm, and wherein the content relevant to the operating scenario includes a third-person view of the simulated autonomous vehicle.

In Example 101, the subject matter of Examples 78-100 includes, wherein processing the search results for training autonomous vehicle operation comprises: converting the search results to a neutral format; and combining the search results with other content to result in a data set to use in training autonomous vehicle operation.

In Example 102, the subject matter of Examples 78-101 includes, wherein processing the search results for training autonomous vehicle operation comprises labeling the search results for use in a supervised machine learning task.

Example 103 is at least one machine-readable medium including instructions that, when executed by processing circuitry, cause the processing circuitry to perform operations to implement of any of Examples 1-102.

Example 104 is an apparatus comprising means to implement of any of Examples 1-102.

Example 105 is a system to implement of any of Examples 1-102.

Example 106 is a method to implement of any of Examples 1-102.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for creating and managing a simulation database system, the system comprising:
   a processor subsystem; and
   memory including instructions, which when executed by the processor subsystem, cause the processor subsystem to:
      access an operating scenario, the operating scenario including parameters defining a simulated driving environment for navigation of a simulated autonomous vehicle;
      access a rule set, the rule set controlling a search mechanism;
      search for content, the search for the content controlled by the rule set and operable to find graphical content from a third party data source that is relevant to the operating scenario, the search resulting in search results including a plurality of images or videos depicting at least one real-world environment;
      process the search results for training autonomous vehicle operation to create a representation of the simulated driving environment, based on the plurality of images or videos from the at least one real-world environment; and
      store the representation of the simulated driving environment.

2. The system of claim 1, wherein the operating scenario parameters includes parameters that define a scenario type.

3. The system of claim 2, wherein the scenario type includes a highway driving scenario, a city driving scenario, or a rural driving scenario.

4. The system of claim 1, wherein the operating scenario includes parameters that define a road type.

5. The system of claim 1, wherein the operating scenario includes parameters that define an operating time.

6. The system of claim 1, wherein to search for content, the processor subsystem is to crawl a network-accessible repository to identify the graphical content from image or video files relevant to the operating scenario using contextual analysis.

7. The system of claim 6, wherein the network-accessible repository is a website.

8. The system of claim 6, wherein the network-accessible repository is a discussion board.

9. The system of claim 6, wherein the operating scenario is to train a house number detection algorithm, and wherein the graphical content relevant to the operating scenario includes side-facing views corresponding to a perspective of the simulated autonomous vehicle.

10. A method of creating and managing a simulation database system, the method comprising:
    accessing an operating scenario, the operating scenario including parameters defining a simulated driving environment for navigation of a simulated autonomous vehicle;

accessing a rule set, the rule set controlling a search mechanism;

searching for content, the search for the content controlled by the rule set and operable to find graphical content from a third party data source that is relevant to the operating scenario, the search resulting in search results including a plurality of images or videos depicting at least one real-world environment;

processing the search results for training autonomous vehicle operation to create a representation of the simulated driving environment, based on the plurality of images or videos from the at least one real-world environment; and storing the representation of the simulated driving environment.

11. The method of claim 10, wherein the operating scenario parameters includes parameters that define a scenario type.

12. The method of claim 11, wherein the scenario type includes a highway driving scenario, a city driving scenario, or a rural driving scenario.

13. The method of claim 10, wherein the operating scenario includes parameters that define a road type.

14. The method of claim 10, wherein the rule set includes a data source parameter.

15. The method of claim 10, wherein the rule set includes semantic analysis parameters.

16. The method of claim 10, wherein searching for content comprises crawling a network-accessible repository to identify the graphical content from image or video files relevant to the operating scenario using contextual analysis.

17. The method of claim 16, wherein the operating scenario is to train a pedestrian detection algorithm, and wherein the graphical content relevant to the operating scenario includes forward-facing views corresponding to a perspective of the simulated autonomous vehicle.

18. The method of claim 16, wherein the operating scenario is to train a house number detection algorithm, and wherein the graphical content relevant to the operating scenario includes side-facing views corresponding to a perspective of the simulated autonomous vehicle.

19. The method of claim 16, wherein the operating scenario is to train a traffic management algorithm, and wherein the graphical content relevant to the operating scenario includes a third-person view of the simulated autonomous vehicle.

20. The method of claim 10, wherein processing the search results for training autonomous vehicle operation comprises:

converting the search results to a neutral format to create the representation of the simulated driving environment; and combining the representation of the simulated driving environment with other content to result in a data set to use in training autonomous vehicle operation.

21. The method of claim 10, wherein processing the search results for training autonomous vehicle operation comprises labeling the search results for use in a supervised machine learning task.

22. At least one non-transitory machine-readable medium capable of storing instructions for creating and managing a simulation database system, which when executed by a machine, cause the machine to perform the operations comprising:

accessing an operating scenario, the operating scenario including parameters defining a simulated driving environment for navigation of a simulated autonomous vehicle;

accessing a rule set, the rule set controlling a search mechanism;

searching for content, the search for the content controlled by the rule set and operable to find graphical content from a third party data source that is relevant to the operating scenario, the search resulting in search results including a plurality of images or videos depicting at least one real-world environment;

processing the search results for training autonomous vehicle operation to create a representation of the simulated driving environment, based on the plurality of images or videos from the at least one real-world environment; and storing the representation of the simulated driving environment.

23. The machine-readable medium of claim 22, wherein searching for content comprises crawling a network-accessible repository to identify the graphical content from image or video files relevant to the operating scenario using contextual analysis.

24. The machine-readable medium of claim 23, wherein the operating scenario is to train a house number detection algorithm, and wherein the content relevant to the operating scenario includes side-facing views from a perspective of the simulated autonomous vehicle.

25. The machine-readable medium of claim 23, wherein the operating scenario includes parameters that define at least one of: a scenario type; a road type; or an operating time.

* * * * *

UNITED STATES PATENT AND TRADEMARK OFFICE
CERTIFICATE OF CORRECTION

PATENT NO. : 11,584,390 B2
APPLICATION NO. : 16/648459
DATED : February 21, 2023
INVENTOR(S) : Ferzli et al.

It is certified that error appears in the above-identified patent and that said Letters Patent is hereby corrected as shown below:

In the Specification

In Column 14, Line 40, in Claim 2, before "includes", delete "parameters"

In Column 15, Line 17, in Claim 11, before "includes", delete "parameters"

Signed and Sealed this
Twentieth Day of February, 2024

Katherine Kelly Vidal
*Director of the United States Patent and Trademark Office*